Figure 1:
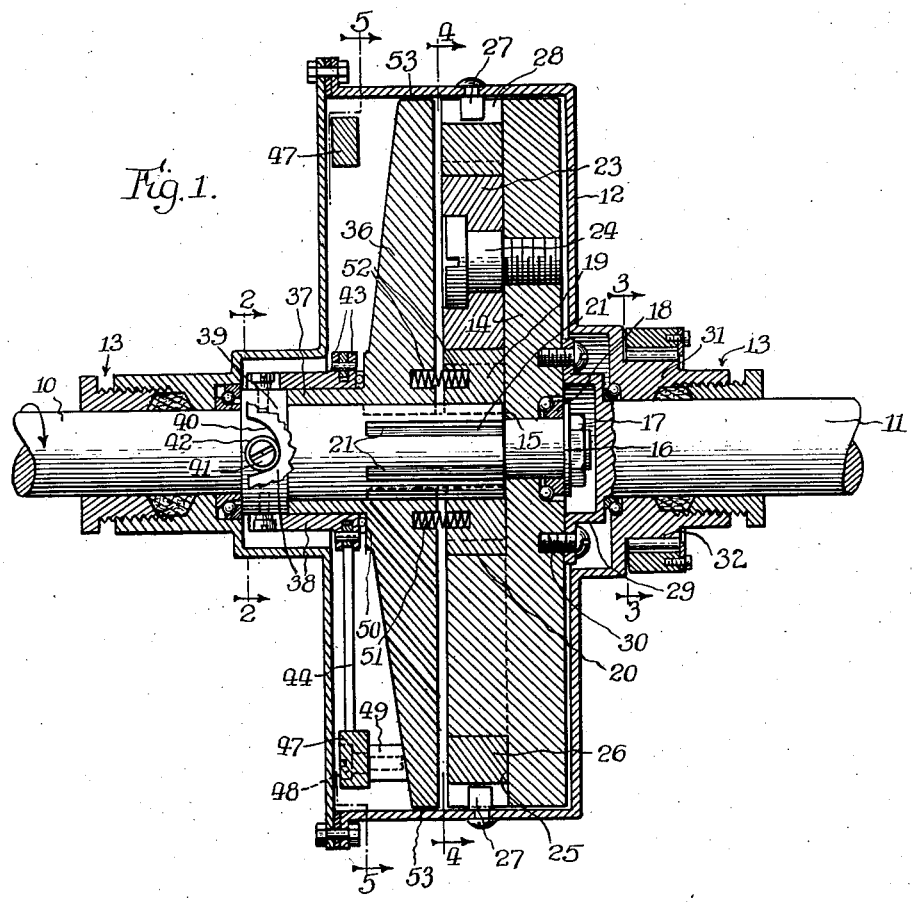

March 12, 1935.  E. L. BARRETT  1,993,988
POWER TRANSMISSION DEVICE
Filed April 6, 1931   2 Sheets-Sheet 1

Inventor:
Edward L. Barrett,
Attys.

March 12, 1935.  E. L. BARRETT  1,993,988
POWER TRANSMISSION DEVICE
Filed April 6, 1931    2 Sheets-Sheet 2

Inventor:
Edward L. Barrett,
Attys.

Patented Mar. 12, 1935

1,993,988

UNITED STATES PATENT OFFICE 1,993,988

POWER TRANSMISSION DEVICE

Edward L. Barrett, Chicago, Ill.

Application April 6, 1931, Serial No. 528,000

13 Claims. (Cl. 74—293)

The invention relates generally to a device for transmitting power from a prime mover to a driven member and more particularly to such a device especially adaptable for use in connection with motor driven vehicles.

The necessity for such transmission devices is generally well-known. For example, one operative extreme requires a transmission of maximum power, while at the opposite extreme of operating conditions, a transmission of maximum speed is essential. Under conditions between these extremes, a transmission of intermediate balances of power against speed must be available. When the power input is constant, the particular transmission required for most efficient operation at any given instant will depend upon the resistance offered to driven movement. Obviously, the same result obtains where the power input varies.

In the case of a driven shaft, the resistance offered thereby to rotation may be termed torque resistance and such resistance, in general effect, varies inversely with the speed of rotation of the shaft. Theoretically, therefore, the correct transmission ratio, by which the most efficient result may be obtained, will be one which, for every condition intermedate the two extremes, will balance the torque resistance against the power input. Under such conditions, sufficient driving power is transmitted to overcome the torque resistance and at the same time the speed of the driven member will be maintained at the highest possible rate commensurate with the power input.

Heretofore the theoretically correct ratios have been only approximated in practice, by providing a series of change speed gears each having a set ratio which must meet particular transmission requirements over a range of varying conditions. This system is obviously inflexible.

An object of the invention is to provide a new and improved power transmission device of high efficiency, and which is flexible to produce a change speed connection between the driving and driven parts for all driving conditions conforming substantially with the theoretically correct ratio required by any particular condition. As an important incident to this object, the invention effects each variation automatically.

Another object of the invention is to provide a device of this character which embodies means for varying the ratio of transmission between the driving and driven members in accordance with the resistance to movement offered by the driven member.

A further object resides in the provision of a novel transmission device in which means drivingly connecting two shafts is affected by the torque resistance of one shaft, on the one hand, and by the torque or speed of rotation of the other shaft, on the other hand, whereby the resultant of the forces produces substantially the required and theoretically correct driving ratio between said shafts.

Still another object of the invention is to provide a power transmission between a driving and a driven shaft which includes means responsive to the speed of rotation of the driving shaft and operative to increase the transmission ratio between said shafts, and means responsive to the torque resistance of the driven shaft for opposing such decrease of ratio, whereby two variable forces have a balancing effect each upon the other to produce approximately the theoretically correct transmission ratio.

More specifically stated, an object of the invention is to provide a flexible transmission for drivingly connecting two shafts, which transmission embodies a member movable as the speed of rotation of the driving shaft increases to ultimately establish a direct driving relationship between said shafts, means operated by the driven shaft for creating fluid pressure opposing the movement of said member and thereby tending to maintain the highest power transmission ratio between the shafts, and mechanism, operative at intermediate balances of the opposed forces, to produce intermediate and variable transmission ratios.

Other objects and advantages will become apparent in the following description and from the accompanying drawings, in which:

Figure 1 is a vertical axial section through a transmission device embodying the features of the invention.

Figs. 2, 3, 4 and 5 are transverse sections through the device taken respectively on the lines 2—2, 3—3, 4—4, and 5—5 of Fig. 1, each looking in the direction indicated by the arrows.

Generally the objects of the invention are attained, in the present embodiment, by employing, as a part of the driving connections between two shafts, an arrangement of gears which is substantially in the form of a planetary gear system. That is to say, a central and driven gear is engaged by a plurality of spaced gears which in turn mesh with an encircling annular or ring gear. By holding the ring gear against movement, the plurality of gears are driven by the center gear and also are caused to travel about the center gear, which movement is utilized to provide a high power transmission ratio between the shafts. Means are provided for gradually decreasing such ratio (which constitutes one operative extreme) until an opposite extreme is reached. This is accomplished by gradually preventing relative rotation between the plurality of gears while allowing the ring gear to move therewith. The result is that, as relative rotation of the plurality of gears ceases, the power transmission ratio decreases until the parts are locked to form a direct driving connection between the shafts.

Rotation of the plurality of gears is controlled by means which function directly in accordance with operative conditions affecting each shaft so that the proper driving ratio for every condition is attained by creating a force by the operative movements of the driving shaft, and a second and opposed force by the operative movements of the driven shaft, and utilizing the resultant of said forces to prevent relative rotation of the plurality of gears.

In describing the preferred embodiment of the present invention, it will be considered, for convenience, that the transmission is embodied in a motor driven vehicle. It will be understood, of course, that the invention is capable of other uses than in this particular connection. While the operative parts of the motor driven vehicle are not illustrated, 10 designates generally a drive shaft which is connected to the motor through a conventional clutch device (not shown). A second shaft 11, which generally is arranged in alinement with the driving shaft 10, constitutes the driven shaft of the assembly and, in a vehicle, is arranged to transmit power to the wheels thereof.

The ends of the shafts 10 and 11 are positioned adjacent each other and a housing 12 of suitable size and shape encloses the adjacent ends of the shafts. Preferably, packing glands 13 of any suitable type (Fig. 1) are provided to seal the housing against leakage along the shafts for a purpose which will hereinafter become apparent. The end of the driving shaft 10 has a flat disk 14 mounted thereon for rotational movement relative thereto. Such means as a shoulder 15 on the shaft 10, arranged to abut a complementary shoulder on the disk 14, prevents axial movement of the disk relative to the shaft in one direction, movement in the other direction being suitably prevented as by means of a washer 16 held on the end of the shaft 10 by a nut 17. If desired, a thrust bearing 18 may be interposed between the washer 16 and the disk 14.

The shaft 10 carries a gear 19 disposed adjacent the shoulder 15 within a recess 20 formed in the disk 14. The gear 19 preferably is splined, as at 21, to the shaft 10 to permit of its axial movement relative to the shaft. The gear 19 constitutes the center or driving gear of a series of gears which are arranged on the order of a planetary gear system (shown most clearly in Fig. 4). At substantially equally spaced intervals, the disk 14 is provided with recesses 22 which are similar to the central recess 20. Each recess 22 carries a gear 23 rotatably secured as by means of screws 24 to the disk 14. Peripherally, the disk 14 is cut away to form a rabbetted groove or annular recess 25 which receives a relatively rotatable internal ring gear 26. Three recesses 22 and gears 23 are shown and these recesses communicate peripherally on the one hand with the central recess 20 and on the other hand with the peripheral face of the disk 14 to permit meshing of the gears 23 with the gear 19 and ring gear 26.

In thickness the gears 19 and 23 and ring gear 26 are preferably equal, and the depth of the recesses, in which said gears fit, is also equal to the thickness of the gears. Consequently, all of the gears and the exposed face of the disk 14 are flush to provide a plane flat surface. The clearance between the teeth of each gear and the adjacent wall of its recess is held to an operating minimum and the abutting faces of the gears and the bases of the respective recesses are suitably finished to provide a close and substantially frictionless abutment.

It will be evident that, if the ring gear 26 is held against rotation and the shaft 10 is driven, the maximum power transmission ratio between the shafts 10 and 11 may be derived. Thus, rotation of the gear 19 drives the gears 23 and, when the gear 26 is stationary, causes a shifting movement of the gears 23 about the gear 19 as a center. This shifting movement of the gears 23 rotates the disk 14 at a speed which is considerably lower than the rotational speed of the shaft 10. Suitable means, such as a spider 29 carried by the end of the shaft 11 and rigidly connected, as at 30, to the disk 14, drivingly connects the disk and shaft 11.

Figure 3:
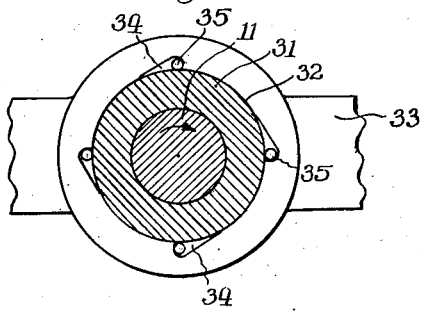
Figure 4:
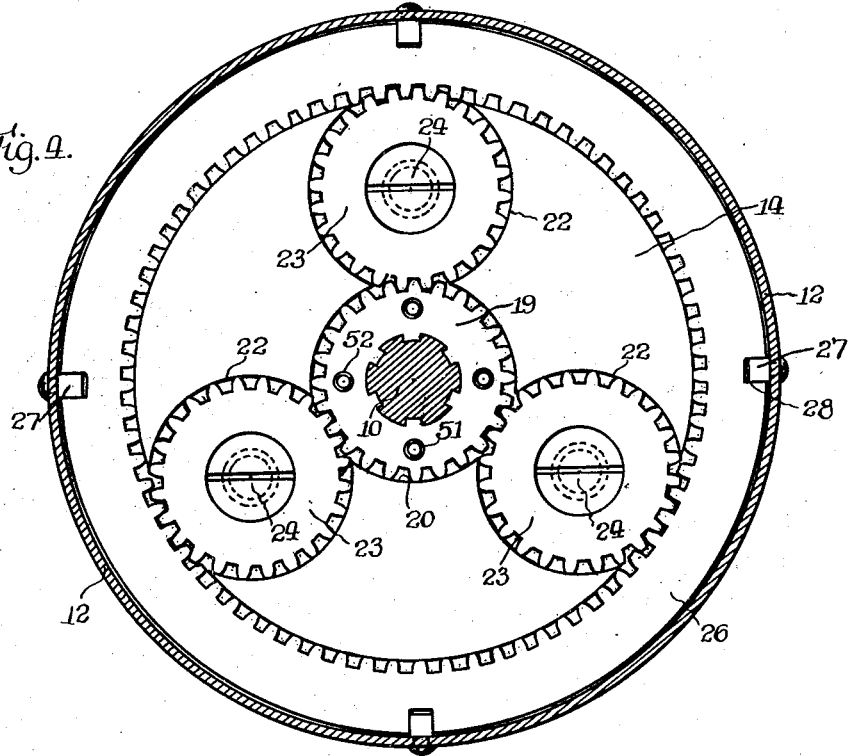

For a purpose to be hereinafter described, it is desirable that the ring gear 26 be held against rotation in one direction only and that it be allowed to rotate freely in the opposite direction. To this end, the ring gear is connected with the casing by such means as a series of pins 27 on the casing extending inwardly therefrom into engagement with slots 28 traversing the peripheral face of the ring gear. This connection prevents relative rotational movement but permits axial sliding movement between the casing and ring gear. With reference to Figs. 1 and 3, a reduced portion 31 of the housing 12 is formed to provide an outwardly facing annular surface 32. A bracket 33, secured to any suitable stationary part, not shown, has a bore therein arranged to fit snugly about the face 32. At spaced intervals, recesses 34 of graduated depth are formed in the face of the bore, which recesses have the shallowest portions thereof disposed on the side toward which relative rotation is to be prevented. Cylindrical pins 35 are positioned in the recesses and are of a diameter which is greater than the shallowest portion of the recesses. Relative rotation of the parts, in a direction which carries the pins toward the shallower portions of the recesses, causes the pins 35 to become wedged between the face 32 on the housing and the bases of the recesses in the bracket 33. Since the ring gear is connected to the casing, the gear will also be held against rotation in one direction. While this direction depends on the direction of rotation of the shaft 10, the arrangement, in general, is such that the ring gear is held against rotation in the direction in which said gear would otherwise be driven when the gears 23 are driven by the gear 19.

Figure 2:
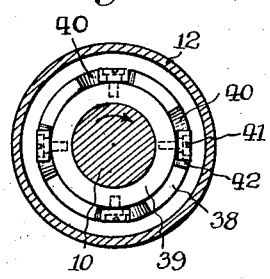
Figure 5:
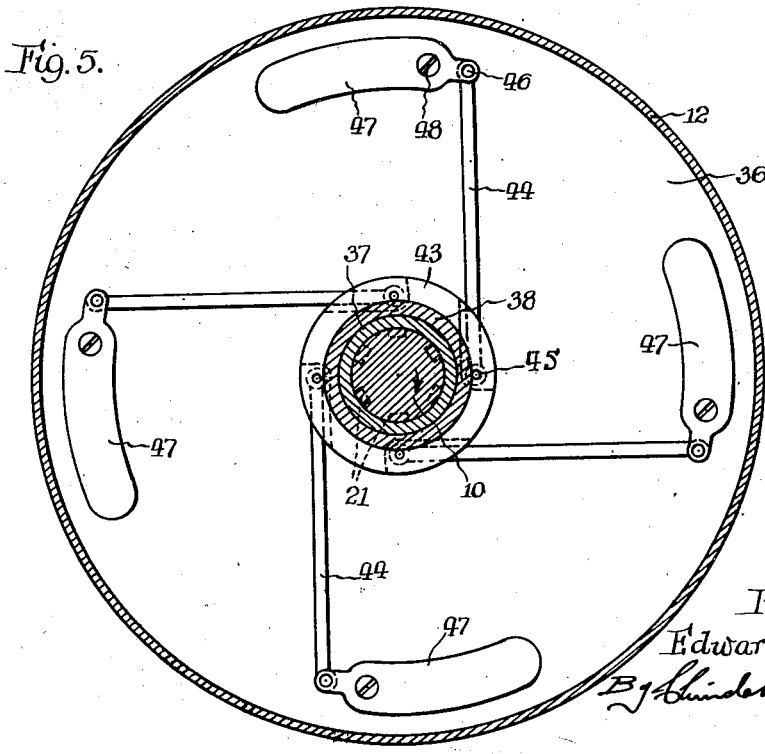

The casing 12 is fluid tight to contain sufficient fluid to cover the gears. Preferably a fluid which will not freeze is employed. As the gears rotate, in immersed condition, they function somewhat in the manner of any simple type of gear pump to create fluid pressure. Means is provided for utilizing this fluid pressure to vary the driving ratio between the shafts 10 and 11. One preferred form of means for accomplishing this purpose is shown in Figs. 1, 2 and 5. A plate 36, which for strengthening purposes is preferably tapered from center to periphery, is carried by the shaft 10 for rotation therewith and for axial sliding movement relative thereto. Preferably, the splines 21, by which the gear 19 is secured to the shaft 10, are used to mount the plate on the shaft. The plate has a hub portion 37 extending in a direction away from the gear 19. The hub 37 carries an encircling and relatively rotatable sleeve 38, arranged to extend beyond the end of the hub into overlying relation with a collar 39 which is rigid with the shaft 10. At spaced intervals, circumferentially of this overlying portion, the sleeve is recessed to provide a plurality of notches 40 of graduated depths. Pins 41, having antifriction elements 42 thereon, are secured to the collar 39 and extend into the notches 40.

The sleeve 38 has a pair of axially spaced, annular flanges 43 thereon (see Figs. 1 and 5) between which, at equally spaced intervals, one end of a plurality of links 44 are pivotally secured, as at 45. The other ends of the links 44 are pivotally secured, as at 46, to a centrifuge weight 47 which, in turn, is pivotally supported, as at 48, by bosses 49 (Fig. 1) affixed to the plate 36 near the periphery thereof.

The preferred arrangement and disposition of the parts is such that the centrifuge weights 47, during rotation of the plate 36, will substantially balance each other when the plate 36 is rotating in a vertical plane. Hence, the links 44 extend from their pivotal connection 45 in a direction which is approximately tangential to the sleeve 38 and is away from the direction of rotation of the shaft 10. The centrifuge weights are preferably pivoted intermediate their ends so that the free or responsive portion of the weights also extends in a direction opposite to the rotational movement of the shaft. As a result, if the shaft 10 be driven in a clockwise direction, as illustrated by the arrow in Fig. 5, the plate 36 is similarly rotated. The centrifuge weights, responding of course to the speed of rotation of the plate 36, swing about their pivots 48 to a greater or lesser degree and, through the links 44, cause the sleeve 38 to rotate relative to the hub 37. The notches 40, in the sleeve, are so arranged that, as the sleeve 38 is rotated by action of the centrifuge weights 47, the graduated portions of the notches are moved into engagement with the pins 41 to shift the sleeve axially of the shaft 10.

Antifriction elements 50 are interposed between the adjacent faces of the sleeve 38 and plate 36 so that, as the sleeve is shifted, the plate is likewise shifted toward the faces of the gears 19, 23 and 26 and the face of the disk 14. The shifting movement of the plate 36 thus occurs in direct response to the speed of rotation of the driving shaft. If desired, movement of the plate 36 away from the gears may be facilitated by such means as springs 51 seated in suitable pockets 52 formed in the adjacent faces of the plate 36 and gear 19.

In describing the operation of the device particularly, it will be advisable to consider the operation under several different conditions. These different conditions can best be illustrated by presuming that the device is in use as the power transmission between the motor and the wheels of a vehicle. When the vehicle is idle, the parts assume the positions illustrated in Fig. 1. When starting the vehicle, power from the motor is gradually applied in the usual manner to the shaft 10 to cause it to rotate in a clockwise direction. Rotation of the gear 19 causes each one of the gears 23 to rotate in a counterclockwise direction and thereby tends to drive the ring gear in a counterclockwise direction. Inasmuch, however, as movement of the ring gear in this direction is prevented, the gears 23 are caused to travel in a clockwise direction within the ring gear. Since the gears 23 are carried by the disk 14, the disk is rotated clockwise to drive the shaft 11. This driving connection constitutes one driving extreme; is the maximum gear reduction; and transmits a maximum amount of power from the driving to the driven shaft. This ratio is, of course, dependent entirely upon the relationship of one gear to another.

As the gears 19 and 23 rotate, they create a fluid pressure between themselves. Similarly, fluid pressure is created by the movement of the gears 23 relative to the ring gear 26. The force of this created fluid pressure depends entirely upon the speed of rotation of the gears which, of course, is directly related to the speed of rotation of the driven shaft 11.

After movement of the driven shaft 11 has been initiated to start the vehicle in motion, the resistance to rotation or the torque resistance of the shaft 11 will decrease as the vehicle gains speed. Now, considering that power is still being applied to the driving shaft 10, the speed of the driving shaft will gradually increase. Since the plate 36 is driven by the shaft 10, its speed of rotation likewise accelerates and causes the centrifuge weights 47 to swing. In accordance with this movement of the weights, the sleeve 38 and plate 36 are shifted toward the faces of the gears 19, 23 and 26, and disk 14. Inasmuch as the only escape for created pressure fluid is transversely of the gear teeth to the exposed faces of the gears, movement of the plate 36 toward said faces constricts the passageway and tends to confine the pressure fluid against escape. As this constriction increases, the created fluid pressure exerts a back pressure on the gears which tends to prevent relative movement thereof. Consequently, the gears 23 become more or less locked to the gear 19 and accordingly cause the ring gear 26 to shift in a clockwise direction therewith about the gear 19.

It will be seen, therefore, that, since the ring gear when stationary is one of the determining factors which produces the maximum power transmission ratio between the driving and driven shafts, any shifting movement of the ring gear decreases this ratio according to the rate of movement. If additional power is applied to the driving shaft, the speed of rotation thereof constantly increases and the speed of rotation of the plate 36 increases until the centrifuge weights shift the plate into tight abutment against the faces of the gears and disk 14. The axial sliding movement permitted the ring and center gears, insures against escape of fluid when the parts are abutting. Obviously, under such conditions, the center, intermediate, and ring gears will be locked together by the trapped fluid to form a direct drive between the shafts 10 and 11. This constitutes the maximum speed transmission.

The speed of rotation of the driven shaft 11, being directly responsive to the torque resistance of the shaft, will, therefore, determine the force exerted by the created fluid pressure. This force, of course, directly opposes the laterally shifting movement of the plate 36 to confine the pressure fluid. If, therefore, at any time the power input on the shaft 10 becomes constant, the laterally shifted position of the plate 36 will become correspondingly constant as determined by the opposing force of the fluid pressure. This relationship will continue as long as the torque resistance of the shaft 11 remains constant.

Should this resistance be increased without variation of the power input, (as when a vehicle starts to ascend a grade), an additional force will be imparted to the intermediate gears 23 to cause relative movement thereof to the center gear 19. This, of course, disturbs the balance of forces and, as the gears rotate relatively, creates additional fluid pressure. The opposing force exerted by the plate 36 has not, however, varied since the rotational speed of the shaft 10 has not increased and the plate 36 will, therefore, be moved away from the gear faces by the force of the additional fluid pressure. The power transmission is thereby increased until a new balance of forces results which will just be sufficient to overcome the increased torque resistance caused by the grade.

If the torque resistance of the shaft 11 is decreased from any constant amount, as when the vehicle is coasting down an incline, the shaft 11, in effect, becomes the driving shaft and the gears 23 run freely about the gear 19. This same result obtains when the power input to the driven shaft 10 is decreased and will continue until equilibrium of the parts is once more established.

As is well understood, a gear pump action creates a tremendous force and it is estimated, in the present embodiment, that at least six zones of force will be present to provide ample force for locking the gears against relative movement. The present construction, moreover, is arranged so that in the balance of one force against the other, all stress is confined to the driving shaft. That is to say, movement of the sleeve 38 and plate 36 in one direction is limited by the collar 39 on the shaft 10, while movement of the plate 14 and its associated parts in the opposite direction is prevented by the thrust bearing 18, washer 16 and nut 17 also on the shaft 10.

It is contemplated that, under some operating conditions, the plate 36 might have a tendency to move too rapidly toward abutment with the gears. This action may be prevented or limited by providing only a narrow clearance or passageway, indicated at 53, between the peripheral face of the plate and the adjacent casing wall. This produces what corresponds to a dash-pot action to prevent the plate from moving rapidly into abutment with the gears. Under normal conditions, this structure will not affect operation.

From the foregoing, it will be evident that, as the speed of rotation of the driven shaft increases, the laterally shifting plate 36 constitutes in effect a control element creating a force which is directly responsive to the speed of the shaft. On the other hand, the torque resistance of the driven shaft 11 is directly responsible for the creation of a force which opposes the force exerted by the shifting plate 36. The balance or resultant of these opposing forces determines the amount of back pressure exerted to prevent relative movement of the gears and, therefore, determines the power transmission ratio between the driving and driven shaft. Under every driving condition, the present device automatically determines the power transmission ratio and, since the ratio is determined by the power input as one factor, and by the torque resistance as another factor, the theoretically correct transmission ratio will be obtained.

The invention, therefore, provides a power transmission which is exceedingly flexible in that all power transmission ratios between two extremes are available. Moreover, the shifting from one ratio to another is automatically responsive to operating conditions.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

I claim as my invention:

1. A transmission device comprising, in combination, a pair of shafts arranged to be driven one from the other, driving connections including meshed gears between said shafts arranged to be gradually correlated to produce transmitting ratios varying between two extremes, fluid-pressure creating means responsive to the operation of one of said shafts, and means responsive to the driven operation of one of said shafts to apply said fluid directly and under variable pressure to said gears to produce a variation of the transmission ratio from one extreme to the other.

2. A transmission device comprising, in combination, a pair of shafts arranged to be driven one from the other, gears drivingly connecting said shafts and correlated to be gradually shifted between two extremes to produce various power-transmitting ratios, fluid-pressure creating means operable by one of said shafts, means connected for movement in accordance with the driven movements of the driving one of said shafts for applying the fluid under pressure directly to said gears to restrict operative movement thereof whereby to effect a shift from one extreme to another, and means effecting a shift in the opposite direction.

3. A power transmission device comprising, in combination, a pair of shafts arranged to be driven one from the other, a train of gears driven by one shaft and drivingly connected to the other shaft, other means for drivingly connecting said shafts as the operation of said gears is prevented, and mechanism for gradually discontinuing operation of said gears and simultaneously inducing operation of said other means, said mechanism including fluid arranged to be placed under pressure by the operation of said gears, and means responsive to the movement of one of said shafts for confining said pressure more or less to said gears to varyingly prevent operation of said gears.

4. A power transmission device comprising, in combination, a pair of shafts arranged to be driven one from the other, a planetary gear system driven by one shaft and drivingly connected to the other and constituting a high power transmission ratio, said system including a gear fastened to the driving shaft, a plurality of gears meshing therewith, and an annular gear meshing with each gear in said plurality, means for holding said annular gear against driven rotation in one direction, means connected to the driven one of said shafts and rotatable with said plurality of gears when said gears move as a unit around said annular gear, a closed container having fluid therein accessible to said gears whereby the gears act as a gear pump to create fluid pressure, and means responsive to the movements of one of said shafts for confining such pressure about said gears varyingly to prevent movement thereof, whereby said annular gear is accordingly carried therewith and the high power transmission ratio is decreased.

5. In a transmission device, the combination with a driving and a driven member, a planetary system of gears connecting said members, means for varying the transmission ratio between said members including shiftable means for directly subjecting said gears to fluid pressure in opposition to the relative movement of said gears, and centrifugal means operated by one of said members for moving said shiftable means according to the driven speed of one of said members.

6. In a transmission device, the combination with driving and driven members, of power transmitting connections therebetween including meshed gears relatively movable at one transmission ratio and relatively immovable at another transmission ratio, means for imposing the force from fluid under pressure directly to said gears to shift said transmission ratios from one to the other, and connections between said last mentioned means and one of said members for moving said means according to the driven movement of said member.

7. A transmission device comprising, in combination, a driving shaft, a driven shaft, and power transmission connections therebetween including transmission gearing arranged to increase the transmission ratio as relative movement of the gearing diminishes, means for supplying fluid to said gearing, and means connected with one of said shafts for shifting movement according to the rotational movement of said shaft variably to confine said fluid about said gearing and thereby subject said gearing to the force of the entrapped fluid.

8. A transmission device comprising, in combination, a driving shaft, a driven shaft, and power transmission connections therebetween including meshed gears having a variable transmission ratio, means for subjecting a fluid to the pumping action of the gears to create pressure fluid, variable means for directing the force of said pressure fluid to said gears to effect a variation of the transmission ratio, and including a connection with one of said shafts operable to shift said means according to the driven operation of said shaft.

9. In a transmission device, the combination with a driving and a driven shaft, of a planetary system of gears connecting said shafts, said gears normally having relative movement induced by one of said shafts and having an increased transmission ratio as said relative movement diminishes, means for subjecting a fluid to the pumping action of said gears, and means movable in accordance with the driven rotation of the other of said shafts to variably oppose the relative movement of the gears by pressure fluid created by the gears.

10. In a transmission device, the combination with a driving and a driven shaft, of driving connections therebetween including a plurality of means movable as a unit to establish a direct drive between said shafts, means responsive to the torque resistance force on the driven shaft to effect relative movement between said plurality of means to produce a drive transmission less than the direct ratio, means for supplying fluid to the device, and means responsive to the power input of the driving shaft to apply fluid under pressure directly against the relatively moving means and in opposition to the effect of the torque resistance force of said driven shaft to resist the said relative movement produced thereby.

11. In a transmission device, the combination with a driving and a driven shaft, of a system of gears connecting said shafts, said gears normally having relative movement induced by one of said shafts and having a varied transmission ratio as said relative movement diminishes, means for subjecting a fluid directly to said gears whereby said gears act on said fluid with a pumping action to produce fluid under pressure, and means for subjecting said gears to the force of such fluid under pressure in diminution of the relative movement between the gears.

12. In a transmission device, the combination with a driving and a driven shaft, of driving connections therebetween having relative movement at a definite and predetermined low transmission ratio, said connections being shiftable to increase said ratio by restriction of such relative movement, means connected with one of said shafts for producing a force in opposition to such relative movement, and means connected with the other shaft for exerting a force in opposition to said first mentioned force.

13. In a transmission device, the combination with a driving and a driven shaft, of driving connections therebetween having relative movement at a definite and predetermined low transmission ratio, said connections being shiftable to increase said ratio by restriction of such relative movement, means for supplying fluid to said connections, and means connected with the driven shaft for applying fluid under pressure directly against said connections to restrict movement thereof.

EDWARD L. BARRETT.